No. 870,113. PATENTED NOV. 5, 1907.
L. C. LEWIS.
STOP AND WASTE VALVE.
APPLICATION FILED JAN. 11, 1907.

Witnesses
Carl Stoughton
F. S. Campbell

Inventor
Lewis C. Lewis,
By C. C. Shepherd
Attorney

UNITED STATES PATENT OFFICE.

LEWIS C. LEWIS, OF COLUMBUS, OHIO, ASSIGNOR TO THE MONARCH MANUFACTURING COMPANY, OF COLUMBUS, OHIO, A CORPORATION OF OHIO.

STOP AND WASTE VALVE.

No. 870,113.     Specification of Letters Patent.     Patented Nov. 5, 1907.

Application filed January 11, 1907. Serial No. 351,801.

*To all whom it may concern:*

Be it known that I, LEWIS C. LEWIS, a citizen of the United States, residing at Columbus, in the county of Franklin and State of Ohio, have invented certain new and useful Improvements in Stop and Waste Valves, of which the following is a specification.

My invention relates to a stop and waste valve and has for its object the provision of a device of this character comprising a main valve and an auxiliary valve, the auxiliary valve controlling a waste port and the parts being so arranged that when the main valve is closed to cut off the water to the service line of a house, the auxiliary valve will be opened to permit the waste of water from said service line to prevent freezing.

Figure 1:
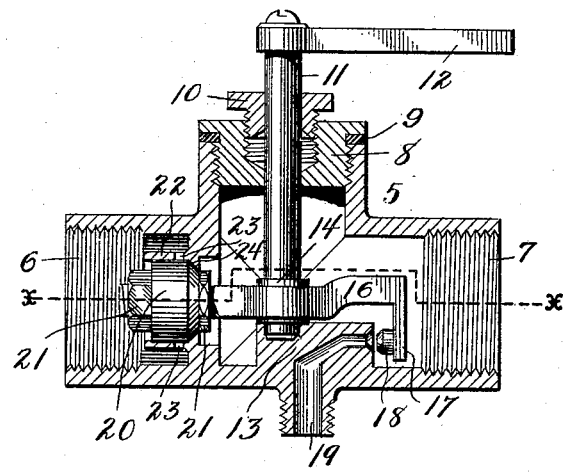
Figure 2:
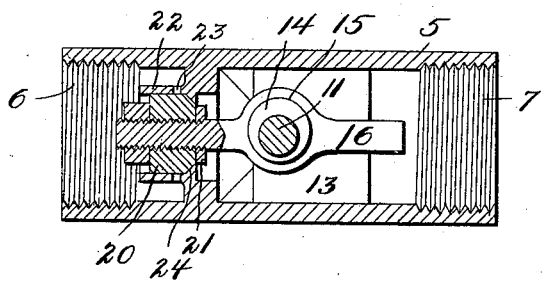

Further objects and advantages of the invention will be set forth in the detailed description which now follows:

In the accompanying drawing: Figure 1 is a vertical section of a valve constructed in accordance with the invention, and, Fig. 2 is a horizontal section upon line x x of Fig. 1.

Like numerals designate corresponding parts in both of the figures of the drawing.

Referring to the drawing, the numeral 5 designates a valve casing which is threaded as at 6 for the reception of an inlet pipe, not shown, and at 7 for the reception of a service pipe, not shown. A nut 8 is threaded into the upper portion of the casing and is adapted to compress a gasket 9 to form a water-tight joint. A packing nut 10 is threaded into the nut 8 and is adapted to compress packing, not shown, about a valve rod 11. Movement may be imparted to this valve rod by a lever 12. The lower end of the valve rod 11 is journaled in a raised portion 13 of the valve casing and an eccentric 14 is carried by this valve rod. This eccentric works in an opening 15 formed in a valve stem 16. The valve stem 16 has a depending portion 17 at one end which carries a valve 18, said valve being adapted when the stem 16 is moved toward the left in Fig. 1, to close a waste port 19 formed in the valve casing 5. A main valve 20 is secured by nuts 21 upon the other end of the valve stem 16, said valve being slidably disposed in a ring 22, which is integral with the valve casing. Ports 23 are formed through this ring and the valve 20 is adapted to engage with a valve seat 24 when the parts are in the position illustrated in the drawing, to cut off the flow of water from the inlet pipe to the service pipe. At this time the port 19 is in communication with the service pipe and water from the service pipe may waste through said port to empty said pipe and thereby prevent freezing in very cold weather. When it is desired, however, to permit water to flow to the service pipe, the handle 12 is turned to cause the eccentric to throw the valve stem 16 to the left sufficiently for the valve 20 to uncover the ports 23. Water will then flow through these ports to the service pipes. This movement of the valve stem 16 closes the port 19 and prevents the waste of water through said port. The ring 22 forms a support and guide for the valve 20 to slide in, there being a very slight play permitted this valve, in order to accommodate the movement of the eccentric.

From the foregoing description, it will be seen that simple and efficient means are herein provided for accomplishing the objects of the invention, but while the elements shown and described are well adapted to serve the purposes for which they are intended, it is to be understood that the invention is not limited to the precise construction set forth, but includes within its purview such changes as may be made within the scope of the appended claims.

What I claim, is:

1. In a device of the character described, the combination with a casing having a longitudinal passage formed therethrough, of a wall which partially closes said passage and which has a valve seat formed therein, a valve adapted to engage said valve seat, a stem to which said valve is connected, a boss upstanding from the bottom of the casing and having a waste port formed therethrough which opens into the main casing at one side of said boss, a depending member formed upon the valve stem, and a valve carried by said depending member which is adapted to close said waste port, and means for actuating the valve stem.

2. In a device of the character described, the combination with a casing having a longitudinal opening formed therethrough and having a vertical extension, of a valve rod mounted to turn in said extension, a valve stem adapted to move longitudinally in the casing, connections between said stem and said valve rod whereby rotation of the valve rod imparts longitudinal movement to the valve stem, a wall which partially closes the longitudinal passage through the casing, said wall having a valve seat formed therein, a ring which projects from said wall, a valve mounted upon said valve stem and slidably disposed in said ring, there being ports formed through said ring, an upstanding boss projecting from the bottom of the main casing and having a waste port formed therethrough which opens into the main valve casing at one side of said boss, a depending member carried by the valve stem, and a valve carried by said depending member adapted to control the flow of fluid through said waste port.

In testimony whereof I affix my signature in presence of two witnesses.

LEWIS C. LEWIS.

Witnesses:
FRANK G. CAMPBELL,
A. L. PHELPS.